(12) United States Patent
Zalewski et al.

(10) Patent No.: US 7,133,659 B2
(45) Date of Patent: Nov. 7, 2006

(54) METHODS OF OPERATING A RESERVATION SYSTEM USING ELECTRONIC DEVICE COVER WITH EMBEDDED TRANSPONDER

(75) Inventors: Thomas W. Zalewski, Irving, TX (US); Michael C Pennington, Forney, TX (US); Randall C. Roberts, Double Oak, TX (US); Steven A. Shaw, Irving, TX (US)

(73) Assignee: Nokia Mobile Phones Limited, Espoo (FI)

( * ) Notice: Subject to any disclaimer, the term of this patent is extended or adjusted under 35 U.S.C. 154(b) by 430 days.

(21) Appl. No.: 10/752,178

(22) Filed: Jan. 6, 2004

(65) Prior Publication Data

US 2005/0085226 A1 Apr. 21, 2005

Related U.S. Application Data

(62) Division of application No. 09/675,618, filed on Sep. 29, 2000, now Pat. No. 6,771,981.

(51) Int. Cl.
*H04M 3/42* (2006.01)
*H04Q 7/38* (2006.01)
*H04B 1/38* (2006.01)

(52) U.S. Cl. .................. 455/403; 455/414.1; 455/558; 705/5; 340/5.61

(58) Field of Classification Search .. 455/414.1–414.3, 455/418–420, 426.2, 556.1–558; 705/5, 705/13, 16–18, 26–27; 340/5.61, 5.64, 5.65, 340/5.7–5.74, 7.2–7.23
See application file for complete search history.

(56) References Cited

U.S. PATENT DOCUMENTS

| | | | |
|---|---|---|---|
| 5,737,710 A | | 4/1998 | Anthonyson |
| 5,864,818 A | * | 1/1999 | Feldman ........................ 705/5 |
| 5,991,749 A | * | 11/1999 | Morrill, Jr. .................. 705/44 |
| 6,091,956 A | * | 7/2000 | Hollenberg .............. 455/456.5 |
| 6,169,890 B1 | * | 1/2001 | Vatanen ...................... 455/406 |
| 6,195,541 B1 | * | 2/2001 | Griffith ....................... 455/406 |
| 6,490,443 B1 | * | 12/2002 | Freeny, Jr. .................. 455/406 |
| 6,711,474 B1 | * | 3/2004 | Treyz et al. ................... 701/1 |
| 6,823,188 B1 | * | 11/2004 | Stern ....................... 455/456.1 |
| 2001/0016825 A1 | * | 8/2001 | Pugilese et al. ............... 705/5 |
| 2002/0099613 A1 | * | 7/2002 | Swart et al. ................. 705/26 |
| 2003/0119485 A1 | * | 6/2003 | Ogasawara ................ 455/411 |
| 2003/0146821 A1 | | 8/2003 | Brandt |

FOREIGN PATENT DOCUMENTS

WO WO 97/44912 11/1997

\* cited by examiner

*Primary Examiner*—Simon Nguyen
(74) *Attorney, Agent, or Firm*—Alston & Bird LLP (57) ABSTRACT

A changeable cover for an electronic device and method of using same in a payment system is provided. The cover has a transponder responsive to interrogation by an electric field. The cover provides an electronic identification number and other information in response to the interrogation signal. Also provided is a system for making payments, comprising at least one mobile station (4) which has an associated cover (100) for providing local data transfer. The system also comprises at least one point of sale terminal or the like, which has a second transceiver for providing data transfer.

2 Claims, 7 Drawing Sheets

METHODS OF OPERATING A RESERVATION SYSTEM USING ELECTRONIC DEVICE COVER WITH EMBEDDED TRANSPONDER

CROSS REFERENCE TO RELATED APPLICATIONS

This application is a Divisional of and claims priority from U.S. Ser. No. 09/675,618, filed on Sep. 29, 2000, now U.S. Pat. No. 6,771,981. Said application incorporated herein by reference.

FIELD OF THE INVENTION

This invention relates generally to mobile station accessories and more particularly to an electronic device cover with embedded transponder and methods using same.

BACKGROUND OF THE INVENTION

There are prior art mobile stations in which the control card includes a subscriber identification unit, such as the SIM (Subscriber Identity Module) used in GSM (Global System for Mobile Communications) standard based systems. The SIM comprises a control unit CPU (Central Processing Unit), program memory ROM (Read Only Memory), data memory suited for long-term storage EEPROM (Electrically Erasable Programmable Read Only Memory) and operation memory suited for saving data during use RAM (Random Access Memory). For using the mobile station, a PIN (Personal Identification Number) number saved on the SIM must be given, generally when the mobile phone is switched on. Other user-specific information, such as telephone numbers, messages, etc. can also be saved in the data memory of the SIM.

There are now also mobile phones which have a data connector for connecting an external data processing unit, such as a portable computer. Thus the mobile phone can be used as a means for data transfer between the portable computer and some other data processing equipment through a radio communication network. In this way it is possible to establish a connection e.g. to the user's bank for checking the balance and effecting payments. However, an arrangement of this kind is not very practical, because a separate cable is needed between the computer and the mobile phone. In addition, the computer must be available for establishing e.g. a bank connection.

Wireless systems, so called smart cards or payment cards, are also known, the said cards being mostly used in payment applications, such as making payments in buses and public telephones. Smart cards like this generally include a central processing unit, a program memory and a data memory. The internal operation of the card in use is controlled by the CPU in accordance with the program code stored in the program memory. The data memory is used for saving information relating to the intended use of the smart card, such as its value in money. For performing the payment transaction, the card also contains means for data transfer, such as a transmitter/receiver based on electromagnetic induction. A disadvantage of smart cards of this kind is, e.g., the fact that several different cards may be needed for different kinds of payment, and so the user must carry a large number of cards. In addition, when the amount of money loaded in the card has been consumed, one needs to buy a new card or load a new amount of money in the card at a sales outlet offering a loading service.

The Japanese patent application JP 4 083 447 presents a mobile phone to which it is possible to add more properties by means of a separate memory card. An application like this is preferably arranged for a certain use, such as for increasing the saving capacity or the telephone number memory. Applications like this are based on a method in which the central processing unit of the mobile phone reads the data saved in the applications (memory cards) and operates in a predetermined way required by the data. A disadvantage of this method is the fact that the functions needed for performing different operations of the applications must be programmed to the central processing unit CPU in advance, whereby the development of new applications also requires changes in the programs of the central processing unit.

The international patent application WO 91/12698 presents a mobile phone to which it is possible to add properties by means of a separate add-in card, such as a smart card. In this way it is possible to restrict the use of the phone by preventing foreign calls, long-distance calls or calls to service numbers, for example. The information about call restrictions is saved on an add-in card which the user has to install in the mobile phone when it is being used. Thus the main use of this method is to prevent the use of some properties of the mobile station.

Automatic identification and data capture technologies are increasingly being used to identify and track items. Radio Frequency IDentification (RFID) transponders, also known as tags or tokens, provide a means of obtaining data without direct contact such as is needed with magnetic strip or bar code technology. Such transponder devices have been around for some time. U.S. Pat. No. 3,713,148 issued to Cardullo et al. on Jan. 23, 1973, and incorporated herein by reference, describes a transponder which includes a changeable or writable memory. An RFID system consists of a transponder, (also referred to as tag or token), with a unique electronic serial number and a reader device also referred to as an interrogator. The tags are self-contained in hermetically sealed capsules or laminates requiring no external power since they get power by rectifying the energy in a field created by the interrogator and storing the energy in capacitive-type circuitry. Nevertheless, some transponders may be powered with small batteries. RFID tags come in a variety of embodiments from a thin, flat and flexible form-factor (thin type) to small capsules (cylindrical type). An example of a thin form-factor is described in U.S. Pat. No. 5,528,222 issued to Moskowitz et al on Jun. 18, 1996. Although the term "radio frequency" is used, other parts of the electromagnetic spectrum may be used to create the energy field. UHF, microwave and millimeter wave sources may be used by the interrogator depending on the distance between the interrogator and the transponder and material to be penetrated. Commercial examples of RFID transponders are the Texas Instruments' Registration and Information Systems (TIRIS) line of transponders available from Texas Instruments (Dallas, Tex.; www.ti.com).

Transponders such as those from Texas Instruments and others may be embedded in keyfobs, cards or other such items. Gas companies are using keyfob or keychain transponders to identify consumers when they buy gas at the pump and charge it to their gas account (e.g. see http://www.mobil.com/speedpass/). The transponders interact with a fueling system such as provided by Gilbarco Inc.— also know as Marconi Commerce systems, 7300 West Friendly Avenue, (Greensboro, N.C.; http://www.marconicommerce.com). The fueling system is described in U.S. Pat. No. 6,073,840 issued to Kenneth O. Marion and assigned to Gilbarco Inc., said disclosure is hereby incorporated by reference. Use of keyfobs adds another thing for a consumer to carry and worry about losing. For example, if one leaves the keyfob with another, such as valet parking attendant, it is possible for the attendant to use the keyfob to fill-up many cars while the owner is having dinner or other activities.

There is also a need to allow consumers to collect coupons from other transactions at different establishments. For instance, consumer may wish to collect coupons from mail inserts, newspapers, and newspapers and redeem these hard-copy coupons. The use of hard copy coupons is time consuming and troublesome for the consumer.

Figure 1:
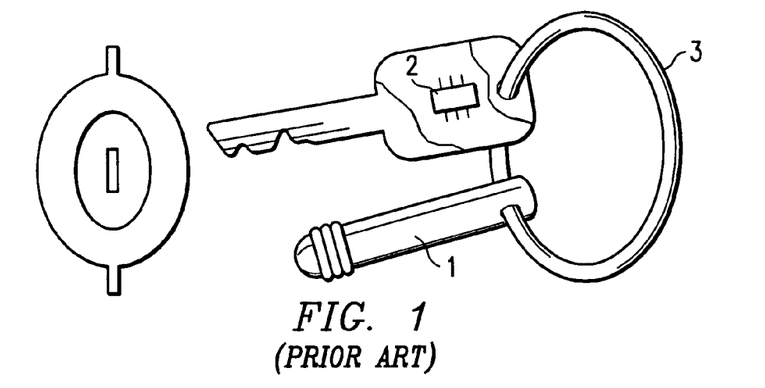
FIG. 1 is an illustration of key ring with an RFID fob transponder and an ignition key having a processor which emits an RF signal.

Furthermore, use of transponders in the form of keyfobs on keyrings have a problem when stored near certain keys which transmit their own codes. Many automobiles are now being manufactured with a microprocessor embedded in the key which sends a signal to a security system coupled to the ignition system. Without the correct code transmitted by the key, the automobile wont't start. But, the keyfob transponder interferes with the coded signal and thus the automobile will not start because the security system can not read the code from the processor in the key. For example, user information regarding the model year 2000 Jeep includes warnings about RFID transponders on the same key ring as the ignition key. FIG. 1 shows a typical transponder to be used on a key ring 3. Transponder 1 is a typical transponder in the form of a keyfob as described above, 2 is a key with embedded processor manufactured to interact with the security system of an automobile. The security system will only allow engine to start if a correct code is transmitted to the security system from the processor embedded in the key. Transponder 1 interferes with the reception of this coded signal.

Additionally, the transponder on a key ring is inconvenient when the consumer is at a drive-through window and must turn off the car in order to access the keyfob on the key ring. Thus, there is a need to have a transponder located away from the key ring associated with the key to the ignition system of an automobile.

In another example of identification systems, some grocery stores are now providing for self-check, wherein the buyer scans their own groceries using bar codes. Additionally, many stores are saving money by not pricing each item but use bar code scanning and shelve area pricing as a means to convey price information. However, sometimes an item may have been moved from its proper location and a means is needed to verify a price. Symbol Technologies, Inc. (Holtsview, N.Y.; http://www.symbol.com) offers a Portable Shopping System. When a shopper enters the store, they are issued a scanner with which they can scan items to determine price and maintain a running total of their purchases. However, the shopper must still go to checkout and present hard copy coupons which the consumer had to clip, sort, file, and redeem at checkout. At checkout the coupons are also scanned individually, which leads to delays and lines. The consumer must also provide cash, credit or debit card to pay for the goods. Thus there is a need for a device which a consumer can carry with them which captures, stores and download coupons, provides a way to keep track of their purchases, and provides a means for automatic payment.

In another example of automated shopping, U.S. Pat. No. 5,729,607 issued to Schkolnick et al. on Mar. 17, 1998 and assigned to International Business Machines describes an intelligent shopping cart. Groceries may be labeled with thin transponders. The transponders on the groceries identify the items and their price. The use of the transponders allows a customer to use a cart as described in the Schkolnick patent or pass through an energy field created by an interrogator and the groceries purchased will automatically be identified and the amount totaled. However, the consumer must sill open a wallet and fumble with cash or debit/credit cards. Thus, there is a need to have a payment system associated with an item which a consumer can wear or hang on their person to facilitate automatic payment.

U.S. Pat. No. 6,078,806 granted on Jun. 20, 2000, entitled METHOD FOR USING APPLICATIONS IN A MOBILE STATION, A MOBILE STATION AND A SYSTEM FOR EFFECTING PAYMENTS from which the present application is a continuation-in-part an assigned to the same assignee provides a method of affecting payments using a mobile station or Personal Trusted Device (PTD).

Thus, for the above reasons, there is a need to have one means of electronic identification and payment which the consumer can carry. Furthermore, there is a need to provide a system in which consumers may earn, store and redeem coupons in a single device.

SUMMARY OF THE INVENTION

In order to eliminate the aforementioned disadvantages and to raise the standard of technology in this field, a new method for using applications in a Personal Trusted Device (PTD) also referred to as mobile radio communication unit comprising mobile station and a changeable cover with intelligence has been invented, as well as a new mobile station with changeable cover as application module and a new system for effecting payments, collecting incentives and other equivalents. The changeable cover provides a means for local data transfer.

The invention is based on the idea that the mobile station can be complemented with applications which have a first mode of operation and a second mode of operation. An application in the first mode of operation does not do anything actively, but stays in the background, passive. In the passive mode, the changeable cover with intelligence may still function to provide for a system of payment. In the second mode of operation, the application is active and can, e.g., control the central processing unit of the mobile station. When in the second mode of operation, the application can also use peripheral equipment which are generally known components of a mobile station, such as a display, keypad, status indicators and data ports, which the application has requested when switching to the second mode of operation.

Applications used in the method of the invention, can preferably be of three different types, depending on the situation in which the application can switch to the second mode of operation: 1) The so-called power-up type, hereby the application switches to the second mode of operation as soon as possible after the mobile station is switched on and/or a new cover is attached, 2) The menu type, in which the user can select the application he wants to be active, e.g. from a menu shown on the display of the mobile station, and 3) Automatic type, in which the application switches to a second mode of operation when a certain condition, defined for the application, has been satisfied. For example, an application of the third operation mode can become active in the GSM system, when the mobile station receives a specific SMS (Short Message Services) message. SMS messages are typically used to transfer short text messages between mobile stations. The automatic type can also be selected from a menu. A menu option can also be used in a situation in which several power-up type applications have been connected to the mobile station, and one of the said applications can switch to the second mode of operation. The method of the invention is characterized in that the application has a first mode of operation and a second mode of operation, whereby the application is passive in the first mode of operation, and in the second mode of operation the application controls the central unit of the mobile station. The mobile station in accordance with the invention is characterized in that it also comprises means for setting the application in a first mode of operation, in which the application is passive, means for setting the application in a second mode of operation, in which the application is active, and means for controlling the central unit of the mobile station when the application is in the said second mode of operation. Remarkable advantages are achieved by this invention compared to the prior art solutions. By means of this invention, the range of possible uses for a mobile station may be substantially increased. Besides the normal phone and data services, the mobile stations related to the invention can also be used e.g. as a credit card and/or as a cash card, instead of traditional plastic cards. By means of a mobile station equipped with a suitable application module the user can make payments in a shop using his/her credit account (credit card application) or pay directly from his/her bank account (cash card application), and thus no real cash is needed. Typical for both credit card and cash card type of applications is that money or its equivalent, in electric form, is stored in a central computer (also referred as a money server) which the mobile station contacts when making a payment. The money server is typically located in a bank's premises. If wanted, it is possible for the application to check the credit limit or the balance of the bank account before the payment is accepted. It is also possible to store money or its equivalent to an "electric money purse" in the mobile station or in the application module, i.e. cover, itself. In that case it preferably is not necessary to check the credit limit or balance of the bank account from the money server before the payment can be accepted, i.e. it is not necessary to contact the money server for making a payment. The information of how much money there is stored in the "electric money purse" can be read from the memory of the mobile station or the application module, from which electric money is subtracted when a payment is made. These kind of applications, where the money is stored in the mobile station or in the application module itself, are also referred as payment applications.

Additional features and advantages of the invention will be readily apparent from the specification and from the drawings.

DETAILED DESCRIPTION OF THE PREFERRED EMBODIMENTS

Figure 2A:
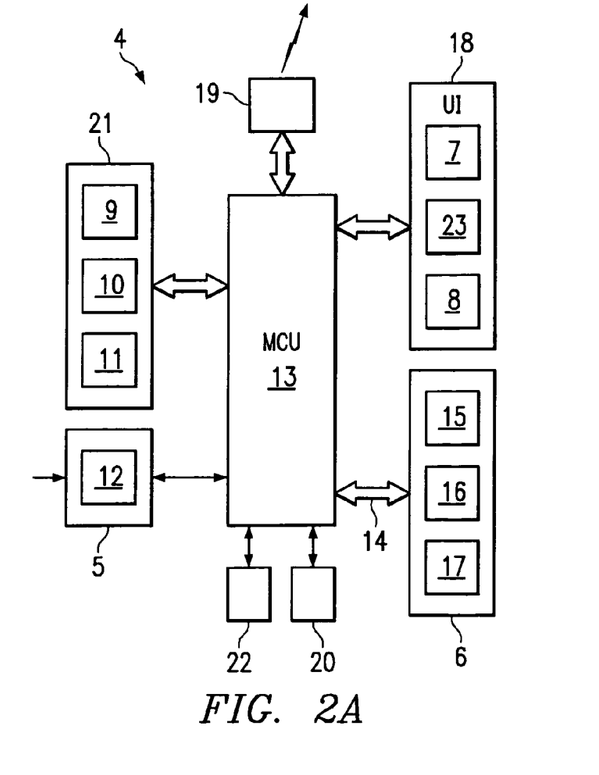
FIG. 2A is block diagram of a mobile station in accordance with the invention.

In FIG. 2A, a mobile station 4, also referred to as a "Personal Trusted Device" (PTD), comprises master control unit MCU 13, user interface UI 18, high-frequency part 19, low-frequency part 21, power unit 5, a means for data transfer 22 which can be IR or other equivalents in the electromagnetic spectrum, and application module connection unit 6. The operation of the mobile station 4 is controlled by MCU 13, which has a program code stored in advance for performing different operations. Mobile station 4 may also comprise Personal Information Management (PIM) capabilities, such as calendar, to-do list, and financial management programs.

The user interface 18 comprises components which are known from prior art mobile phones, namely a display 7, a keypad 8 and status indicators 23. MCU 13 produces various, situation-specific messages, operation instructions, menus etc. on the display 7. Using the keypad 8, the user can enter different kind of information to the mobile station 4, such as the identification number and telephone number, and select operations from the menus. Status indicators 23 can preferably be used to indicate the internal modes of operation of the mobile station 4. The display may also be in the form of glasses worn by the user implemented using LCD screen(s) or the display may be Virtual Retinal Display such as is provided by MicroVision (Seattle, Wash.) and described in U.S. Pat. Nos. 5,596,339; 5,659,327; 5,701,132; 5,982,255; and 6,008,781 assigned to University of Washington.

The radio frequency component 19 is a known component of mobile phones, which is used to transmit and receive calls and messages using radio frequencies in a radio communication network, such as a GSM network, e.g. through a mobile services switching center MSC.

The low-frequency part 21 preferably comprises a microphone 9, a headphone 10 and a buzzer 11 or the like.

The operation power for the mobile station 4 is supplied by a battery 12, which is charged when required. Power unit 5 monitors the charge status and charging procedure of the battery 12, among other things. Power unit 5 sends the information to central unit MCU 13 when the charge status of the battery 12 falls below a predetermined value, whereby MCU 13 announces this preferably by sounding buzzer 11 and/or showing a message on the display 7.

A module card may be coupled to the module card connector located in the mobile station 4. Module card may contain, among other things, a subscriber identity module (SIM) for user identification and memory for storage of logic and data. This memory may be volatile such as RAM and non-volatile memory such as EEPROM, flash or the like.

Application module connection unit 6 is located in mobile station 4 as shown in FIG. 2A. Other module cards can also be connected to application module connection unit 6 of the exemplary embodiment, whereby they are preferably connected to their own module card connectors. From application module connection unit 6 to the central processing unit of mobile station 4 (MCU), there is application module bus 14, by means of which the application modules connected to application module connection unit 6 communicate with MCU 4. AT commands, known e.g. from modems, can be used for the transfer of data and commands.

In addition to the application module bus 14, there is a separate control and data line from each application module connector 15, 16, 17, of the application module connection unit 6. Thus it is possible to use a structure based on the standard series ISO 7816 in the control and data line. The standard series ISO 7816 includes the voltage levels and timing diagrams, according to which the application modules are connected to the control and data line.

For each application module, application module connecting unit 6 has a connector, through which application module bus 14 is led to the application module. More than one application module may be connected to the same module card 13. The second application module on the module card 13 can be a SIM module, for example.

Figure 2B:
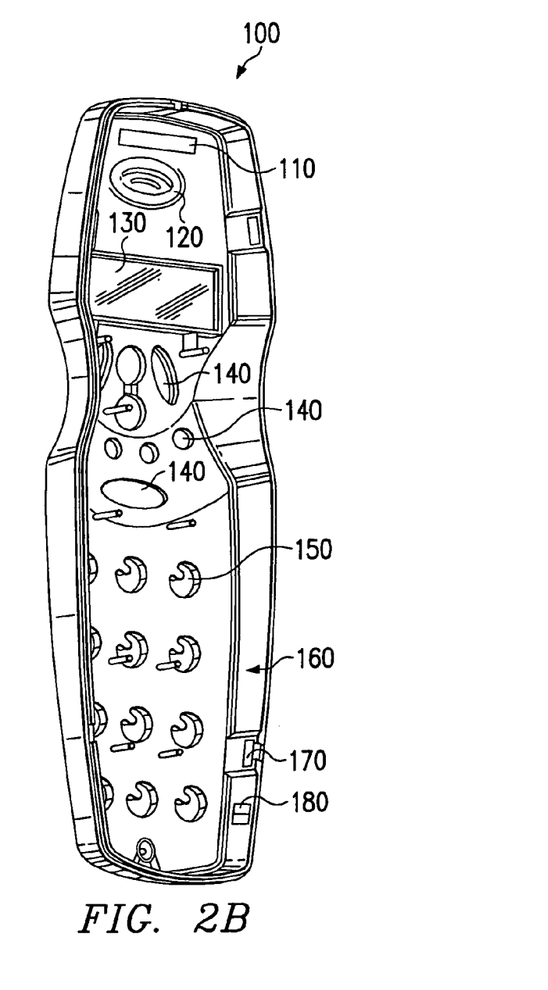
FIG. 2B is an illustration of an electronic device cover in accordance with the invention.
Figure 3:
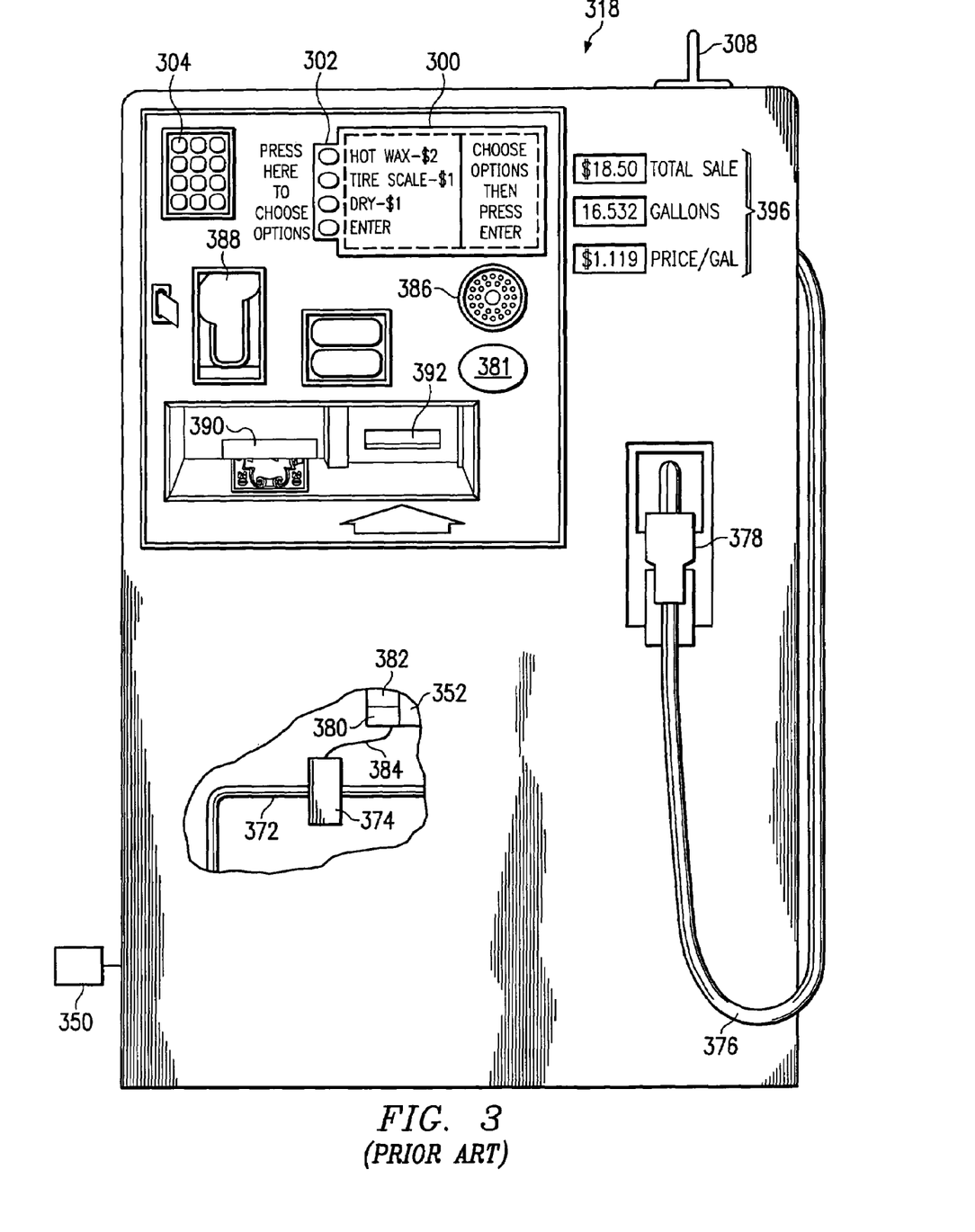
FIG. 3 is an illustration of a fueling dispenser.

The mobile station 4 also comprises a first means of data transfer, such as an infra red IR transmitter/receiver 22 or other equivalent frequencies in the electromagnetic spectrum. The first means of data transfer can be used to transfer data, with relatively short distances, between the mobile station 4 and a cash register (payment terminal), fuel dispenser as shown in FIG. 3 or, e.g., between two different mobile stations 4. The a first means of data transfer may also serve as a bar-code reader to read and transfer coded data in the form of bar-codes into memory. The first means of data transfer may also include a data connector 20, which can be used to couple a computer to the mobile station 4 or may also be used to couple a cover for mobile station 4 as is shown in FIG. 2B. Mobile station 4 may comprise a housing for elements listed above wherein the housing may be coupled to a removal cover.

FIG. 2B a detailed view of a removable cover in accordance with an embodiment of the present invention. An embodiment of the present invention is for use with mobile station 4 but may also be used in conjunction with other devices such as an MP3 player for example.

Removable mobile station cover with intelligence called SmartCover™ accessory or hereinafter cover 100, comprises an RFID transponder 110, grill opening 120 for speaker of mobile station, transparent element 130 through which to view display of mobile station, plurality of function key through-openings 140, plurality of alpha numerical key through-openings 150, external wall element 160, catch projection 170, cover to phone interface contacts 180. Signals such as serial input/output data, read/write signal and other controls signals use these contacts to provide an interface between mobile station 4 and cover 100 through data connector 20.

RFID transponder 110 may be a cylindrical or wedge type transponder attached to cover or it may be thin type embedded in the material of cover 100. Cover 100 may also comprise non-volatile memory to store logic and data. The transponder is read by way of a reader also known as an interrogator. Data codes are encoded into the transponder and sent to the reader in response to an interrogation signal. The pattern of circuits may also be produce in a design using conducting ink and the like.

Cover 100 may also be used to transfer optical signals using optical relays currently in the art. Other equivalents for EM energy sensors, optical devices such as Dense Wave Multiple Access (DWMA) and Surface Acoustical wave (SAW) devices may also be created using methods for ink jet printing and self-creating structures such as surfactant-templated silica mesophase structures created using techniques currently under development by Jeffrey Brinker et al. at Sandia Corporation (Albuquerque, N. Mex.) and other companies. Attention is directed to U.S. Pat. Nos. 5,057,296; 5,098,684; 5,858,457; 5,911,858; 5,949,071; 6,027,706; 6,037,612; 6,054,111; 6,057,377; and 6,090,545 all incorporated herein by reference.

Covers 100 are changeable and thus allow the device on which cover is attached to become an electronic key for e-commerce or mobile (m-commerce) applications such as secure area access, commodity purchasing and the like.

As was described in FIGS. 2A and 2B, contacts 180 allow for electrical signal coupling between an electronic device, such as mobile station 4 in FIG. 2A, and the cover 100. This allows the cover to share memory with the electronic device. In the case of a mobile station, interfacing with the mobile station allows for uploading/downloading of data from wireless networks. Thus "Digital Money" or other equivalents such as digital coupons and the like can be loaded into the phone for use in an exchange using the RFID transponder equipped cover 100. The transponder may also send a coded signal to the registers of MCU to instruct the mobile station to change to passive mode or even power down. This is useful in situations where mobile station use is not allowed or may be unsafe. An example would be in a fueling situation as will be described below. Another example would be on an aircraft where use of a mobile station will interfere with the aircraft instruments.

Additionally, a interrogator may be installed as part of the security system of a motor vehicle. A reader with directional interrogation may interrogate the driver side of a motor vehicle in which the motor is running and the gear is in drive. Thus the mobile station of the driver is disabled while driver is operating the motor vehicle.

Unlike Bluetooth (www.bluetooth.com), which requires acceptance of the standard, infrastructure, device design and development; RFID system infrastructures already exist for many commercial and consumer applications. Covers 100 may be sold as accessories for electronic devices and would be inexpensive—thus disposable and interchangeable. In an example of an embodiment of the present invention, the mobile station with cover 104 may replace the existing RFID tag, which may be in the form of an electronic badge, keyfob tab, smartcard or the like. Since many people carry mobile stations wherever they go and many wear the mobile station on their person, the mobile station with cover 104 provides a means for data transfer in an electronic payment system as described in U.S. Pat. No. 6,078,806.

The covers 100 may also be preloaded with content such as electronic cash, coupons, icons, animation, ring tones and the like. For example, Disney may provide a cover which has their copyrighted characters preloaded into memory. This is a secure way in which copyrighted material may be distributed. Internet download, distribution by disc or other such methods may result in abuse by the user of Disney copyrighted material—i.e. user may download the software to their system and than share the disc with someone else resulting in Disney losing royalty revenue.

Purchase of Fuel

Current RFID transponder systems for cash-less transactions such as the keyfob are "One Way" transactions. The keyfob transponder only validates the user but does not provide any means of feedback or interaction to the user. The keyfob does not have any user interface, limiting the transaction to an "authentication only" process for purchase or access. Currently, a transaction takes place by user placing RFID keyfob in proximity of reader panel for start of transaction and validation. Any remaining transaction interface is done via the RFID reader at the Point of Sale (POS). by incorporating the RFID tag and mobile station into one device (mobile station and cover) 104, feedback to the user is now possible through the mobile station's user interface (display and keypad). Follow up with the customer after the transaction is also possible. The POS station may provide a paper receipt. However, by using a mobile station with cover 104, an electronic receipt may be provided. Additional security may be provided by use of the PIN number already used to access the user's mobile station.

In the environment of fuel dispensing systems, signs at the dispensers and in cellular telephone user manuals provide warnings against using a cell phone near fueling and other potentially explosive areas. Unlike Bluetooth which requires active use of the phone (www.bluetooth.com), RFID type transponders are responsive to energy transmitted from installed devices at the pumps. The fuel dispenser described below and in U.S. Pat. No. 6,073,840, assigned to Gilbarco is designed for use around fuel. Therefore, a passive mode of a mobile station as provided in is necessary around fueling areas. The interrogator of the fueling dispenser described below can place the mobile station into passive mode.

FIG. 3 is an illustration of a fuel dispenser manufactured by Gilbarco, Inc—aka Marconi—(Greensboro, N.C.) and described in U.S. Pat. No. 6,073,840. Fuel dispenser 318 provides a fuel delivery path from an underground storage tank to a vehicle. The delivery path includes fuel delivery line 372 having fuel metering device 374. Fuel delivery line 372 communicates with fuel delivery hose 376 outside of the dispenser 318 and delivery nozzle 378. Nozzle 378 provides manual control of fuel delivery.

Fuel dispenser 318 also includes dispenser control system 380 having one or more controllers and associated memory 382. Dispenser control system 380 may receive volume data from the metering device 374 through cabling 384 as well as provide control of fuel delivery. Dispenser control system 380 may provide audible signals to an audio module and speaker 386 in order to provide various beeps, tones and audible messages to a customer. These messages may include warnings, instructions and advertising.

Dispenser 318 is preferably equipped with a payment acceptor, such as a transponder interrogator area 381, card reader 388 or cash acceptor 390, along with a receipt printer 392. There may be other interrogators such as overhead or embedded in the pavement. With these options, the dispenser control system 380 may interrogate a transponder passed near transponder interrogator area 381, read data from the magnetic strip of a card inserted in the card reader 388 or receive cash from a customer and communicate such information to a central control system 350 such as the G-site controller sold by Gilbarco Inc., (Greensboro, N.C.). The interrogators located overhead may be used to change the mode of the phone to passive mode for safety reasons.

Figure 12:
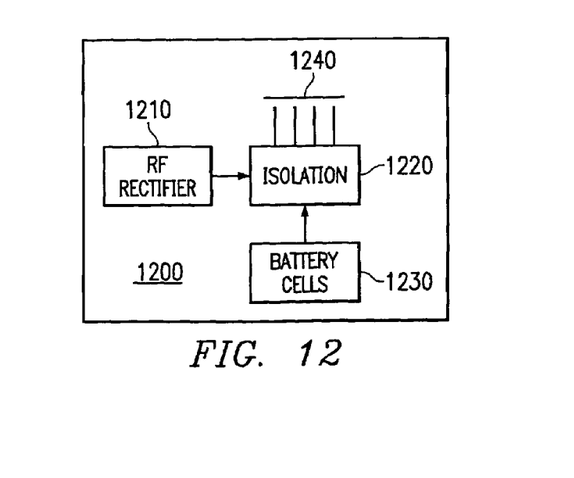
FIG. 12 is a block diagram of a battery with isolation circuitry in accordance with an embodiment of the invention.

In addition to placing the phone in passive mode, the interrogators may also provide a signal to operate isolation circuitry which will prevent current from flowing from battery to electronic device—thus further reducing chances of a spark. FIG. 12 is a block diagram of a battery with isolation circuitry in accordance with an embodiment of the present invention. Battery circuitry 1200 comprises energy collection rectifier 1210, which may be similar to the RFID circuitry but does not transmit. Energy collection block 1210 is coupled to isolation circuitry 1220 which is disposed between power supply 1230 and contacts 1240. Current is normally provided to electronic device from power supply via contacts 1240. However, when battery is within the area in which the RF energy is transmitted from interrogator, the energy is collected by 1210 and supplies isolation block 1220 with a signal which is used by isolation block 1220 to prevent current from flowing. Isolation block may be transistors with leads from energy rectifier supplying voltage to gate of said transistors creating a depletion region between source and drain thus preventing current flow. The power supply may be a plurality of battery cells for storing power in the multiple way which is known in the art.

Transponder interrogator area is coupled to interrogator electronics 352. Central control system 350 typically communicates with a remote network, such as a card verification authority, to ascertain whether a transaction proposed to be charged to or debited from an account associated with the card inserted in the card reader 88 is authorized. Dispenser 318 will include one or more types of displays, preferably one or more alpha-numeric displays 396 together with a high-resolution graphics display 300. Graphics display 300 will generally have associated key pad 302 adjacent to the display or integrated with the display to provide a touch interface. Dispenser may include an additional, auxiliary key pad 304 associated with the card reader 388 for entering secret codes or personal identification numbers (PIN's). Notably, the displays 396, 300 and key pads 302, 304 may be integrated into a single device and/or touch interface. Dispenser control system 380 is preferably comparable to the microprocessor-based control systems used in GRIND (card reader in dispenser) and TRIND (tag or transponder reader in dispenser) type units sold by Gilbarco Inc. under the trademark THE ADVANTAGE. As noted, the dispenser control system 380 may include or be associated with dispenser communication electronics referred to as interrogator electronics 352 for providing remote unidirectional or bidirectional communications between a transponder either and the dispenser. Although the preferred communications method includes radio frequencies in the microwave range, these communications may include other RF, infrared, acoustic or other known remote communication methods acceptable for use in a fueling environment. Additionally, the dispenser 318 may include one or more antennas 308 associated with the dispenser interrogator 352.

Figure 4:
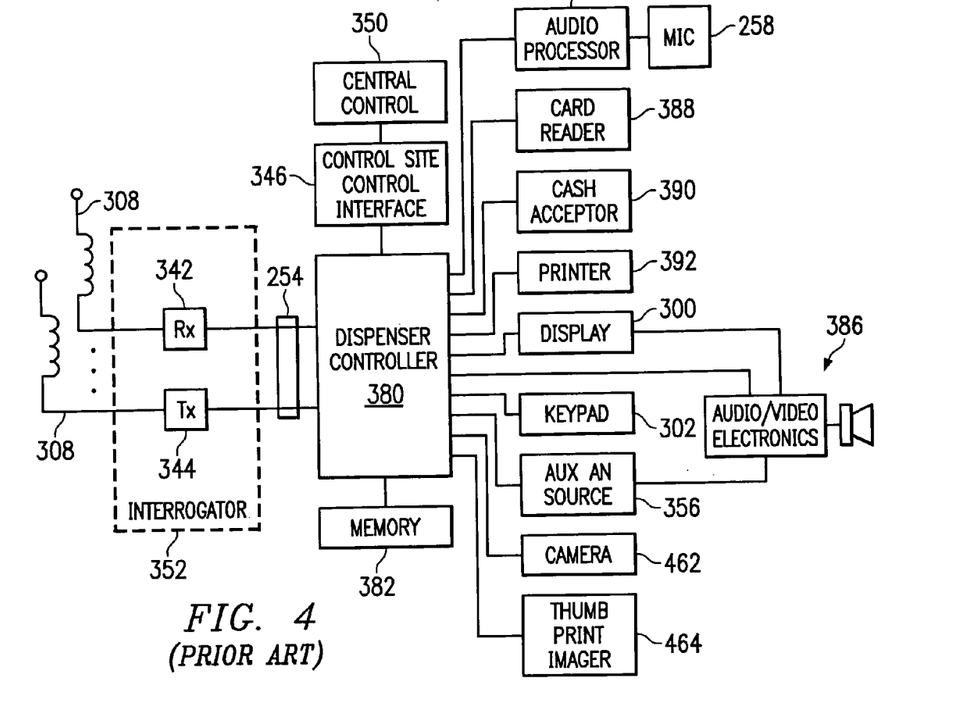
FIG. 4 is a block diagram showing the dispenser electronics of the dispenser shown in FIG. 3.

FIG. 4 shows a basic schematic overview of the dispenser electronics available from Gilbarco, Inc. cited above wherein a dispenser control system 380 includes a controller associated with the memory 382 to interface with the central control system 350 through an interface 146. The dispenser control system 380 provides a graphical user interface with key pad 302 and display 300. Audio/video electronics 386 is adapted to interface with the dispenser control system 380 and/or an auxiliary audio/video source 356 to provide advertising, merchandising and multimedia presentations to a customer in addition to basic transaction functions. The graphical user interface provided by the dispenser allows customers to purchase goods and services other than fuel at the dispenser. The customer may purchase a car wash and/or order food from the QSR while fueling the vehicle. Preferably, the customer is provided a video menu at the display 300 to facilitate selection of the various services, goods and food available for purchase. The RFID interrogator 352, card reader 388 and cash acceptor 390 allow the customer to pay for any of the services, goods or food ordered at the dispenser while the printer 392 will provide a written record of the transaction. The dispenser control system 380 is operatively associated with a dispenser interrogator 352, which has a receiver 342 and a transmitter 344. The receiver and transmitter typically associate with one or more antennas 308 to provide remote communications with a transponder. The dispenser control system 80 communicates with the central control system 350 in the backroom 326.

Currently, consumer drives up to fuel island, exits vehicle, places RFID keyfob up to fuel dispenser's RFID transponder interrogator window 381. Consumer is validated and gas purchase is authorized. After fuel dispensing is complete, consumer may receive receipt generated at printer 392, consumer then enters vehicle and drives away.

In one embodiment of the invention, cover 100 as a means of data transfer in passive mode and mobile station 4 are passed inside a EM field created by reader/interrogator. As is known in the art, the interrogator may transmit at a first frequency and the transponder may reply at a second frequency. The signals are modulated in order that encoded data may be transferred between reader/interrogator and transponder. The modulation scheme may be pulse-width, phase-amplitude or the like which are known in the art. Cover with mobile station combination 104 comes within this field. Cover 100 then responds to provide reader/interrogator with information such as electronic identification mobile station phone number and the like. The reader/interrogator may also send a code to a register of MCU instructing phone to go to passive mode. Since information regarding user's mobile station phone number may be provided to the reader/interrogator, user's mobile station may receive a Short Message Service (SMS) message at some point after RFID validation when customer is safely away from the fueling area. Active use of mobile station is not necessary because SMS messages may be receive by a server of a service provider while mobile station is in passive mode and send SMS minutes or hours after customer leaves gas station and mobile station is back in active mode. The message may thank customer for shopping with the fuel vendor and offering some incentive to visit their convenience store at a later date (i.e. "Digital Cash" or other equivalents offering complimentary coffee, soda or discount on some item if visited within a certain time period). Additionally, the incentive can be a cross-promotion with another company offering "Digital Cash" to be redeem while shopping for groceries for example. This encourages consumer to visit fuel vendor convenience store or other associated store even without the need to purchase gasoline. Cover and mobile station combination 104 allows vendor to reach out and touch customer at some point after transaction has been completed.

The SMS message can also be parsed and information provided for entry into Personal Information Management (PIM) applications running on mobile station. For example, the message may be parsed for amount of sale, date, and expense category for entry into an financial application to track expenses.

Figure 5A:
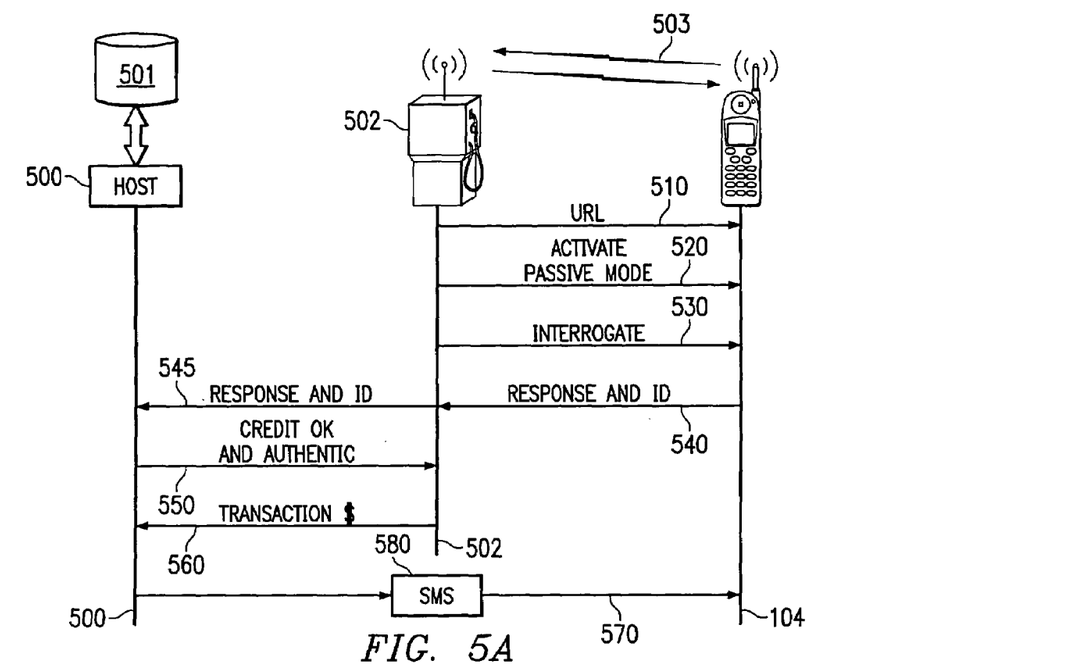
FIG. 5A is a step diagram showing a transaction system in accordance with the invention.

FIG. 5A is an illustration of example of a system for purchase transactions in accordance with an embodiment of the invention. The system comprises, host 500 coupled to database 501, transaction kiosk 502 (e.g. gas dispenser), mobile station with cover 104. Host may be gas company authorization server or a server located at a company which provides transaction approval services or the like.

The following is an example only. Modifications and substitutions by one skilled in the art after reading the specifications including the claims are deemed to be within the spirit and scope of the invention. Although separate steps are described, some steps may be combined depending on the specifications of the interrogator and RFID tag in cover 100. The transaction starts 503 when mobile station with cover 104 is within the EM field created by interrogator 352 in kiosk 502. Interrogator electronics in kiosk 502 may provide mobile station with cover 104 with a URL of the transaction provider for later download of transaction information and other such communication via the internet (step 510). In the case of a fueling transaction, interrogator in kiosk 502 (fuel dispenser) sends a signal through contacts 180 in cover 100 (FIG. 2B) to data connector 20 writing to registers in MCU 13 (FIG. 2A). The signal may command the mobile station to switch to passive mode (step 520). The interrogator requests ID at step 530. Cover 100 responses with ID (step 540). The response and ID information is sent to host 500 at step 545. Host 500 looks up ID in database 501 and if OK sends transaction approval to kiosk 502. A hardcopy receipt may be provided. A SMS message is sent through wireless bearer service provider 580 in step 570.

As described above the SMS message may be parsed for information which may be downloaded into a Personal Information Management (PIM) system. The SMS message may also be specially formatted as is provided for in U.S. Pat. No. 6,078,820 issued to Well et al. on Jun. 20, 2000 and assigned to assignee of the present invention and is hereby incorporated by reference. The formatted data will provide data identifiers which the software applications available to mobile station 4 may use to read the data. The following is an example of such a message:

```
//
APP;ID982
,error:<description>
,TITLE:GAS
,MSG:ACME
,DATE:040900
,TIME:1230
,AMOUNT:2100
```

The parsing system provided by U.S. Pat. No. 6,078,820 is an example of one parsing system there are others which are known in the art.

An embodiment of the present invention my also use Wireless Application Protocol WAP. Information on WAP can be found at http://www.wapforum.org. WAP is bearer independent, therefore WAP applications can operate on the widest number of air interfaces. The WAP specification defines a protocol stack that can operate on high latency, low bandwidth networks such as SMS. WAP specifies a mark-up language which is a version of eXtensible Markup Language (XML). XML allows the use of Metadata in web documents. Metadata is information about information. Therefore, data may be tagged by using Wireless Mark-up Language (WML) and the content (i.e. receipt) pushed—sent to mobile station and cover 104—or pull—requested from mobile station with cover 104.

Figure 6:
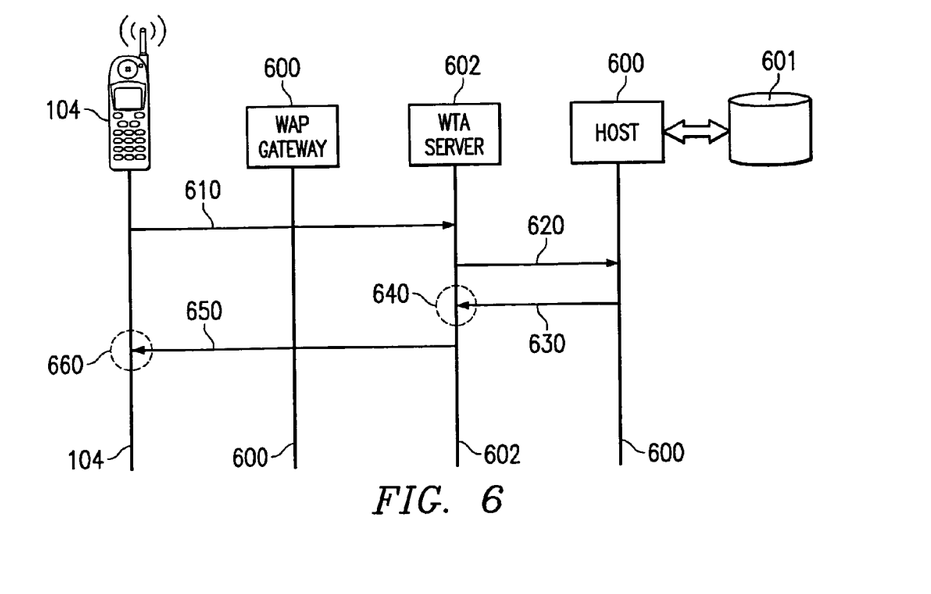
FIG. 6 is a step diagram showing a receipt of transaction information via Wireless Application Protocol.

FIG. 6 is an illustration of how an embodiment of the present invention will operate in a WAP environment. It is an examplar only, modifications and substitutions are still within the spirit and scope of the invention. Mobile station with cover 104 sends the host server's URL to Wireless Telephony Application (WTA) server 602 through WAP gateway 600 (step 610). WTA requests content from host 600 (step 620). Host 600 looks up transaction in database 601. Host 600 replies with the tagged content to WTA server at step 630. At this point, WTA may apply an XSL style sheet to the data at 640 and send the parse data to mobile with cover 104 at step 650. At point 660, WTA may access mobile station with cover's 104 application and load the data into a database.

The "Digital Cash" may also be used like gift certificates for a commodity or entertainment (i.e. Starbucks Coffee, movie theatre tickets, etc). By implementing the SmartCover cover as a "Digital Cash" gift certificate (possibly with vendor's logo on the cover—Starbucks, AMC, General Cinema, etc), the mobile station's user interface can be utilized to indicate number of visits, amount of "Digital Cash" remaining or to communicate some post-transaction SMS advertisement or additional "Digital Cash" collection opportunity. The certificate may also be in the form of an SMS or another type e-mail as birthday or other type gift.

Currently, a gift certificate with predetermined cash value is purchased and utilized by purchaser or given to someone for their use at the vendor location or retail chain where the certificate is accepted. At a future date, the certificate is submitted for credit towards a commodity purchase or admittance to a show. Value remaining on certificate may be refunded in the form of cash if the amount remaining cannot be refunded in the form of another gift certificate representing the remaining amount. The problem is that gift certificates must be carried, reducing likelihood of spontaneous purchases with the vendor where the certificate is accepted. Also, in many instances, remaining certificate value from a transaction is refunded to customer in the form of cash, which might not be utilized at the vendor's place of business.

In accordance with the present invention, cover gift certificate has a greater chance of always being with the customer as it is part of the customer's mobile station. Vendor advertisement is possible through the design/cover, resulting in free advertisement. Since the "Digital Cash" value of cover is stored electronically, the remaining "Digital Cash" value from a transaction can be recorded either in the cover's RFID programmable tag, mobile station 4 memory or on the RFID reader host network, increasing the likelihood of all of the "Digital Cash" value being spent with that vendor. Once the "Digital Cash" value of the cover is expanded, the cover may be discarded or additional cash value can be programmed back into the cover by visiting vendor's place of business or vendor/promotor's website as is provided for in U.S. Pat. No. 6,078,806.

Virtual ATM and Food Shopping

As in the fueling example, addition of mobile station allows the cover to become a reusable and secure cash card or act as a debit card and a means of local data transfer as shown in U.S. Pat. No. 6,078,806 hereby incorporated by reference and portions reproduced below.

When the "Digital Cash" has run out or more is needed, the electric money purse of the mobile station needs reloading. There are several methods to do that. One method, close to the approach with real money and ATM (Automatic Teller Machine) machines, would be to walk to the nearest "Digital Cash ATM" to download more money from the account. This is not very handy, because it will take some time before these kind of "Digital Cash ATM" machines are widely available. The present invention offers a much more convenient way to do the reloading of "Digital Cash".

Using the SMS service, it is possible to download more "Digital Cash" from the bank account to the mobile station. The mobile station sends a request to send more "Digital Cash", e.g. as a SMS message, to the money server responsible for the user's account. As a response, suppose the account has balance, the money server sends "Digital Cash" to the mobile station, where it is stored to the memory. SMS is used as an example only other services may also be used, e.g. Wireless Application Protocol (WAP) as used in the fueling example above.

In accordance with the present invention, cover 100 has contact points 180 (in FIG. 2B) connecting mobile station 4 platform to the RFID tag in the cover 100. "Digital Cash" value can now be loaded into the cover via mobile station 4 and WAP. For instance, a maximum amount of "Digital Cash" (say $100.00 at a time) could be transferred Over-the-Air via WAP from an account (bank or wireless carrier account). The liability is now limited to $100.00. Furthermore, mobile station 4 may require a PIN to authorize any RFID cash-less transaction, making this a more secure method of payment than a credit card, a safer method than carrying cash and more convenient than a traditional cash card or debit card as this cover "Digital Cash" value can be added to via the mobile phone at any time. The mobile station and cover combination now becomes an electronic wallet where cash value may be transferred wirelessly, eliminating the need to locate a ATM machine to obtain cash for small cash purchases such as fast food.

Figure 5B:
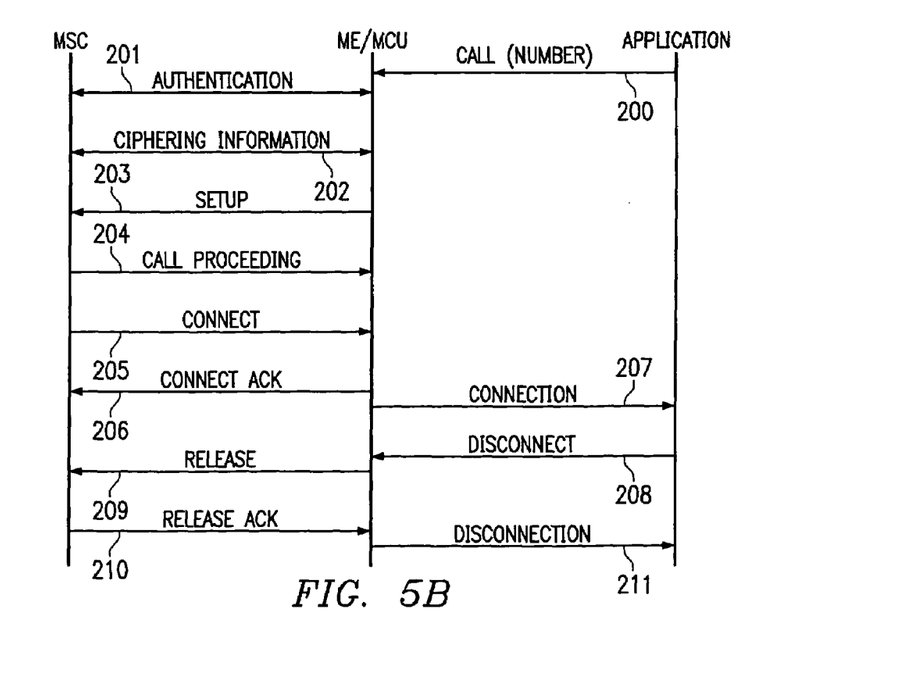
FIG. 5B shows the path of the telephone call between the application and a mobile services switching center (MSC) in a mobile radio communication network as a simplified diagram.

FIG. 5B shows a simplified diagram of a telephone call between the APPLICATION running on mobile station with cover 104 and the Mobile Services Switching Center MSC, which is part of a mobile services network. At step 200, the application sends the telephone number to be called to the MCU of the mobile station 104, which sends to the Mobile Switching Center MSC the identification data and other data needed for establishing a connection (steps 201, 202 and 203). The switching center MSC transmits information of the progress of the call (step 204) and the state of the connection (step 205) to the mobile station 104, after which the mobile station 104 sends acknowledgment of connection to the MSC (step 206) and to the application 18 (step 207). For closing the connection, the application 18 sends a close connection command to the MCU of the mobile station 1 (step 208), which sends a close connection request to the Mobile Services Switching Center (step 209). The MSC sends a connection closed acknowledgment to the MCU of the mobile station 104 (step 210). Finally, the MCU of the mobile station 104 sends to the application information of the closing of the connection (step 211).

In the previous exemplary embodiment of the invention the money was stored in an account, finally located in a money server in a bank. Therefore it was necessary to update the balance in the mobile station and in the bank. In another embodiment of this invention the electric money is stored to the mobile station 4 or cover 100. When that kind of electric money (also referred to as "Digital Cash or transaction credit value information") is used, e.g. for paying parking fees or phone bills, the corresponding amount of money is cut down from the electric money purse of the mobile station 104. The "Digital Cash" can be stored e.g. as a code word in mobile stations memory. No link between the payment terminal 1021 (FIG. 10) and the money server 1022 is required at the moment when the payment is made.

When the "Digital Cash" has run out or more is needed, the electric money purse of the mobile station needs reloading. There are several methods to do that. One method, close to the approach with real money and ATM (Automatic Teller Machine) machines, would be to walk to the nearest "Digital Cash ATM" to download more money from the account. This is not very handy, because it will take some time before these kind of "Digital Cash ATM" machines are widely available. The present invention offers a much more convenient way to do the reloading of "Digital Cash".

Using the SMS service, it is possible to download more "Digital Cash" from the bank account to the mobile station, using a method close to the one described in the previous embodiment of the invention concerning balance inquiry. The mobile station sends a request to send more "Digital Cash", e.g. as a SMS message, to the money server responsible for the user's account. As a response, suppose the account has balance, the money server sends "Digital Cash" to the mobile station, where it is stored to the memory.

The network, where the mobile station in accordance with the invention is used is not limited to GSM only, GSM is a good example of a system that offers required data transfer possibilities. Particularly the SMS messages available in GSM network are handy, because the normal phone/data channel is not effected when transferring SMS messages.

In addition to payment applications, the method of the invention can also be used for other kinds of applications. For example gathering and presenting other information, such as timetables, stock prices, exchange rates, etc. Each of the previous examples can be implemented in a separate application module, or the wanted functions and applications can be combined to a multi-functional application module for the mobile station.

Grocery Shopping

Many people use coupons when they shop for groceries and other items. This requires the consumer to clip the coupons from magazines, newspapers, boxes of item previously purchase and the like. Currently bar codes are being used to encode information regarding products, bar codes may also be used in print advertising to condense a lot of information into a small space. As shown in FIG. 2A, mobile station 4 also comprises a first means of data transfer, such as an optical or infra red IR transmitter/receiver 22. Other equivalent frequencies in the electromagnetic spectrum may also be used. Transmitter/receiver 22 may be used to transfer the data encoded in the bar codes to the memory of the mobile station 4 or cover 100. Thus, consumer/users now may store coupons in memory of mobile station 4 or cover 100 as a form of "Digital Cash," and user interface 18 may be used to keep track of the coupons stored in memory. When consumer/user goes to the store, the same phone may be used to scan items purchased, keep track of total bill, and validate the coupons. When the consumer checks out, the "Digital Cash" may automatically be redeemed at Point of Sale and electronic coupons for items purchased may be validated and electronically transferred to clearing house or other such means for coupon handling as is known in the art. As described above, information regarding the transaction may be automatically enter in a PIM application provided mobile station 4 has PIM capabilities.

Parking Meters

Figure 7:
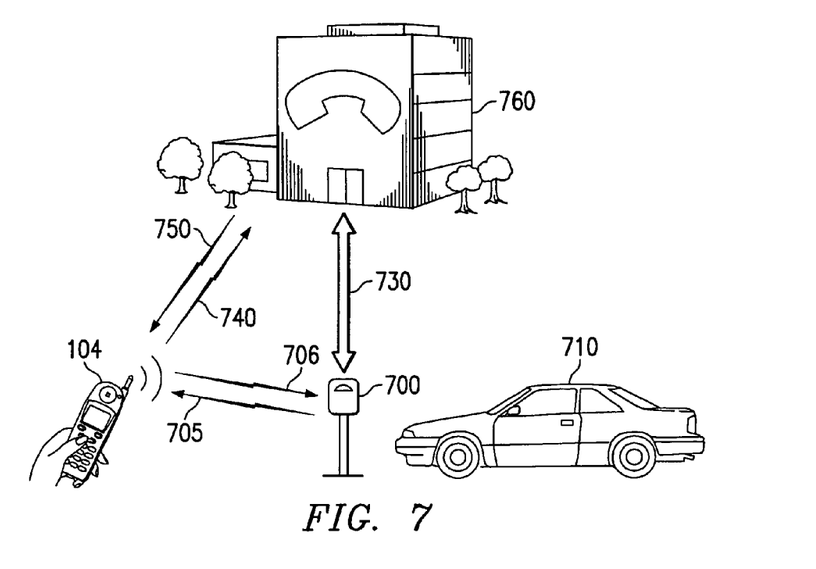
FIG. 7 shows the use of a method for the remote payment of parking in accordance with the invention.

FIG. 7 shows the use of a method to pay for parking meter time. Car 710 parks in front of parking meter 700. Parking meter 700 comprises sonar, IR or other means to determine that an automobile is parked in the space for which the meter 700 collects parking fees. Parking meter 700 also comprises means for communication with central site 760, and RFID interrogator for communication with mobile station and cover 104. Means of communication to central site may be by point to point wireless connection, wireless LAN or through a central civic bus. Such as bus which is being installed in several cities ties traffic lights, traffic flow information and the like to a central site.

The method begins when user wishes to park automobile 710 next to parking meter 700. User places mobile station 104 close to parking meter 700. Interrogation signal 705 reads ID information stored in cover 100 and provides mobile station 4 with information such as rates and location of central site 760 through cover 100 and contacts 180. Cover provides ID by return signal 706. User enters parking time desired and transmits the information to central site 760 via SMS or the like 740. Central site 760 then authorizes parking meter for desired time through communication means 730. Timing information may be maintained at central site 760, parking meter 700 or the like. A SMS or the like 750 may be sent to mobile station 104 informing user of expiration of parking time and user may respond with additional digital cash being transferred to parking authority through another SMS or the like 740 to central site 760.

Automatic Hotel/Car Rental Registration

Figure 8:
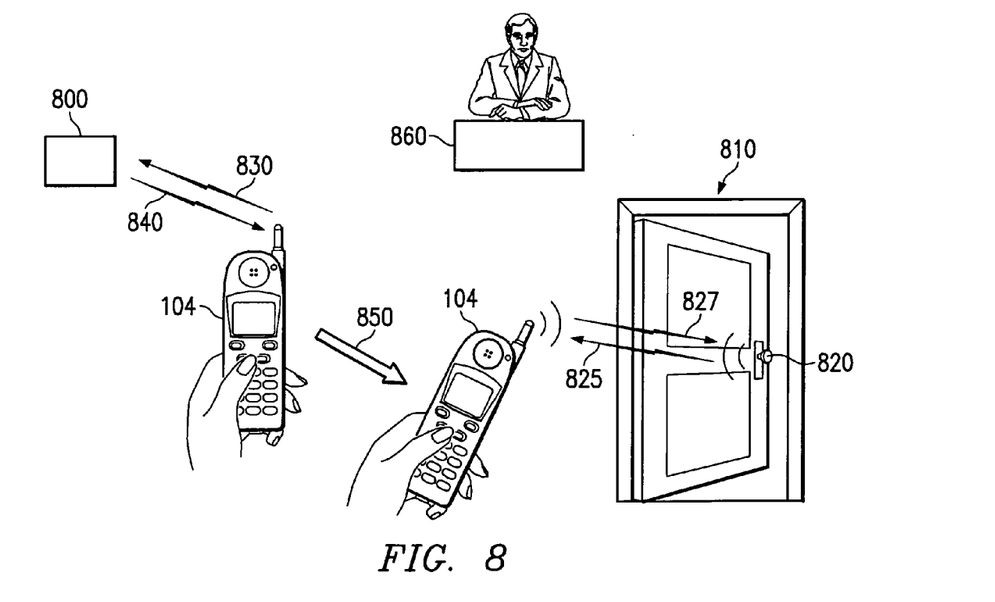
FIG. 8 shows the use of a method for hotel room access in accordance with the invention.

FIG. 8 shows the use of a method for hotel room access in accordance with the invention. User may use mobile station 104 to send request for room SMS or the like 830 to a central reservation site 800 to reserve a hotel room. Central reservation site 800 may send return SMS or the like 840 comprising with room number, ID code, directions and other information. User may then proceed 850 directly to room bypassing desk clerk 860. User then may place mobile station 104 close to door lock 820 which comprises an interrogator. Lock interrogates 825 cover 100 and cover responds 827 with code received from central reservation site 800. Thus door 810 is unlocked.

Car reservation system is similar. Central rental cars systems at airports are becoming common. For example, at Dallas/Fort Worth airport (DFW) all rental car agencies are now in the same facility. The keys are kept with the cars and to prevent stealing of cars individuals leaving with cars must pass through gate and show their contract to a guard. With a mobile station with cover 104, the keys may be locked in the car. User requests reservation and as was described above received the ID code to unlock the car and get to the car keys. Thus, only authorized renters are allowed access to the interior of the car and the keys. Future car systems may use the mobile station with cover as a key to the operation of a car; thus, doing away with physical keys.

Fast Food Restaurants

Many fast food restaurants do not accept credit cards. This is due to percentage of the transaction which the fast food restaurants are required to pay for credit cards services. This results in lost sales from prospects that do not have any cash on hand. Time at POS for cash transaction is another problem. Cash transactions require correct change be given to customer and that cash exchanging hands is inspected for authenticity. This adds to the total transaction time and limits speed at which customer can be processed. Cash transactions are also vulnerable to shrinkage at the POS.

To solve this problem, the fast food vendor may have a Point of Sale (POS) private wireless system (PSID) which would allow customers to have wireless phone access on their system for reduced airtime fee. The mobile station with cover 104 would log onto the PSID and register the customer. At that point the customer receives a SMS or WAP push message welcoming that customer, listing the number of recent visits and asking if the most recent menu choices would like to be purchased. This allows for menu choice to be made before customer ever approaches the counter. Thus reducing waiting in line time is reduced. The customer would then approach the counter where his/her meal would be waiting for payment which requires simply swiping the mobile station over the POS RFID reader. The cash amount in the cover is correctly adjusted by the POS reader. In the case where the cover is used as a debit card, the correct amount is debited from the corresponding account.

Figure 9:
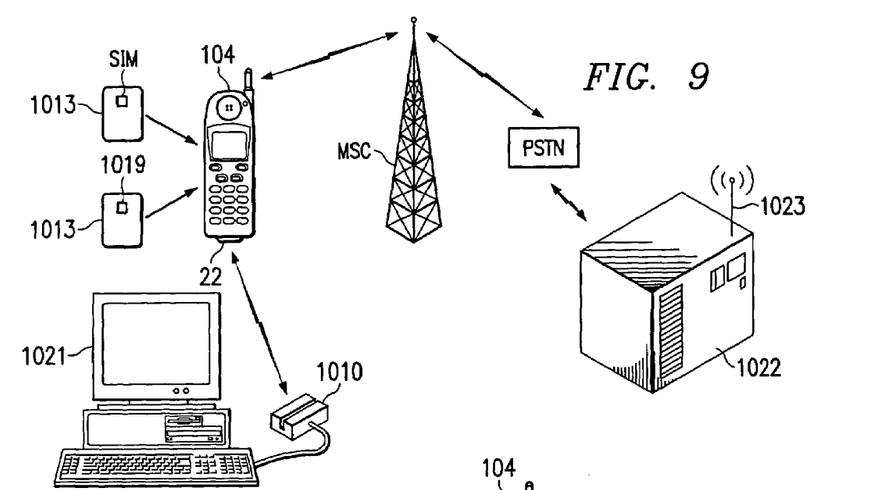
FIG. 9 shows the use of a method in accordance with the invention in connection with a Point of Sale (POS) terminal.

FIG. 9 shows the use of a mobile station with cover 104 and application cards 1013 with microprocessor 1019. Mobile station 104 is in contact with Mobile Switching Center (MSC) with is in turn in contact with a Point of Sale (POS) terminal 1022 through Public Switch Telephone Network (PSTN). POS terminal 1022 may comprise means for local data transfer 1023. Mobile station 104 may also exchange data with a PC like terminal 1021 connected to a communications network such as the Internet. Data exchange may be via means for data transfer 22 on mobile station 104 and means for data transfer 1010 coupled to PC terminal 1021.

Figures 10, 13:
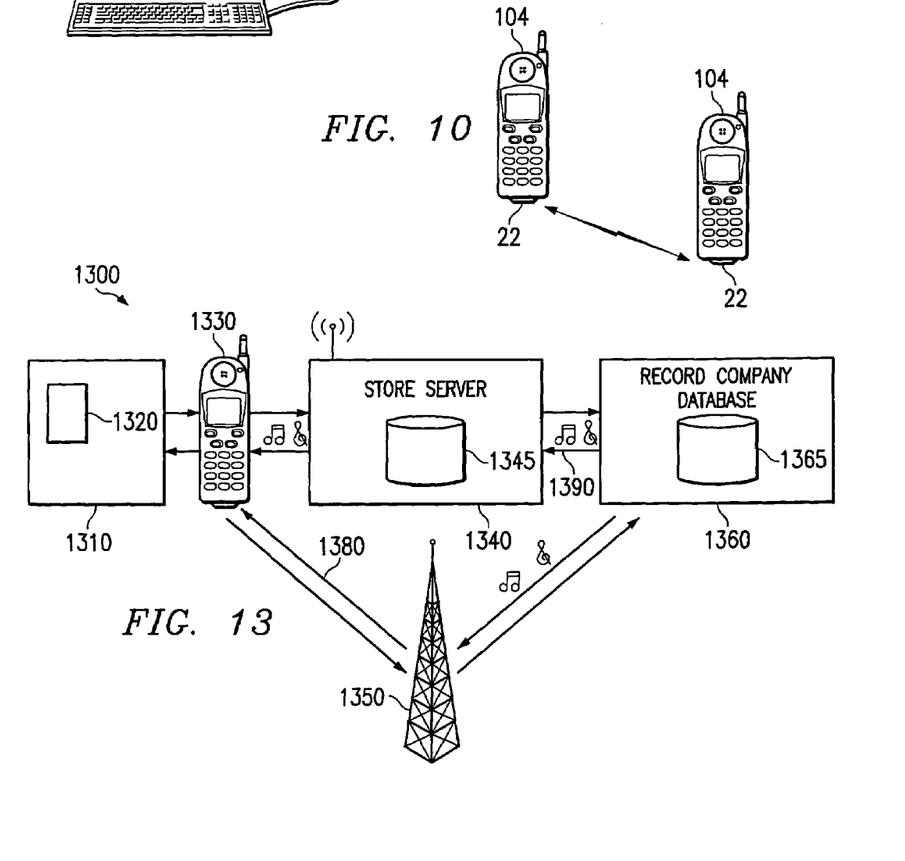
FIG. 10 shows the communication between two mobile stations in accordance with the invention.
FIG. 13 is a block diagram showing an purchase preview system for music purchase in accordance with an embodiment of the invention.

Payments and transfer of coupons in form of "Digital Cash" and other digital codes may be transferred between two mobile stations. FIG. 10 shows an application in which two mobile stations 104 do communicate with each other by means for data transfer 22. It is possible to transfer digital data such as video and/or speech.

Figure 11:
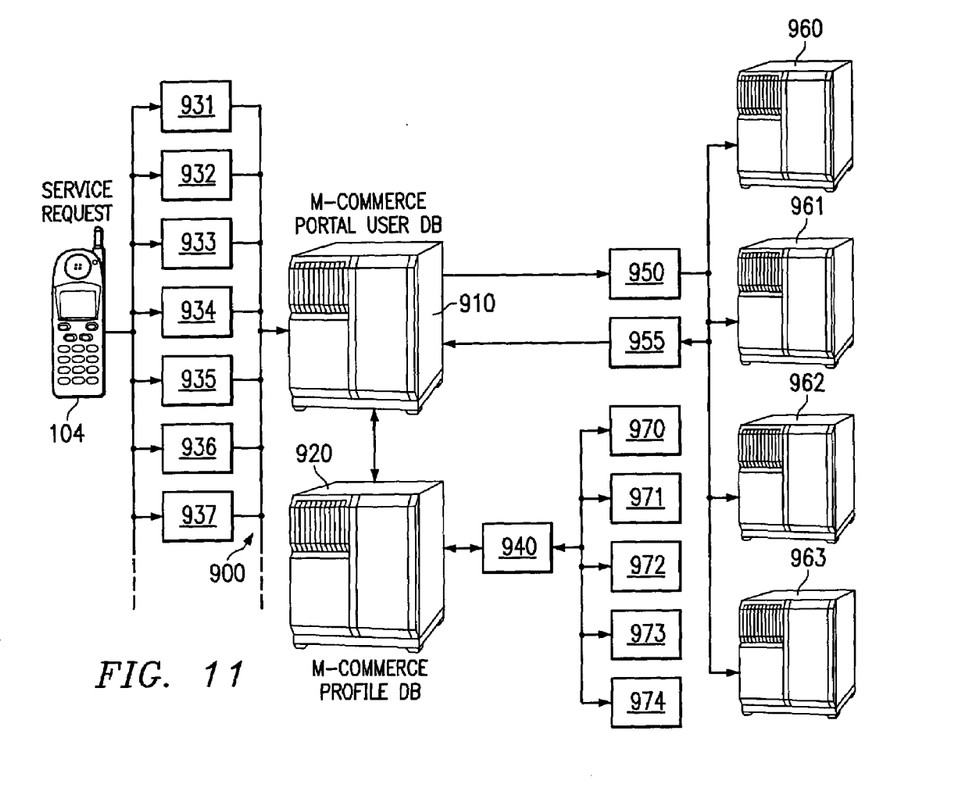
FIG. 11 shows a business model for M-Commerce in accordance with the invention.

FIG. 11 shows an M-commerce model 900 for use of a mobile station with a changeable cover in accordance with an embodiment of the invention. Consumer using mobile station with cover 104 may shop at a variety of promotion channels 93X. These may include a home improvement store 931, video rental store 932, fast food restaurant 933, coffee house 934, grocery store 935, electronics store 936, book store 937, or the like. A central portal database 910 may be maintained wherein service requests from mobile station with cover 104 are processed. The portal may request charge authorization 950 from a plurality of credit account issuers or authorizers 96x. They may comprise Visa, MasterCard, American Express, First Data, and the like. The credit issues 96x authorizes the charge and sends notice of authorization 955 to portal 910. Charges may also be charged to the user's phone bill. A profile database 920 may also be maintained. This database may collect marketing, purchasing habits and other data regarding the consumer of the mobile station so that services suitable to the consumer may be offered by wireless service providers 97x. Examples of such providers are VoiceStream, AT&T, Verizon, Sprint, SBC Wireless, and the like. Data mining is made easier by use of a database separate from the central portal database, since consumers who choose maximum privacy can be excluded from the profile database and access to portal database limited to transaction authorization only.

Music Preview

Music stores currently provide listen kiosk where you can listen to selections of music media. However, the drawback to the system is one is limited to the selection of music playing at the listening station kiosk. An embodiment of the invention provides a solution. FIG. 13 is an illustration of a system wherein a consumers may download samples of music which they may wish to purchase. The label on the box storing the media 1310 with the music may have an RFID tag 1320 on it which has an identification number or a bar code written on the label. The media may be CD or DVD or the like. A reader in a mobile station 1330 would interrogate the RFID tag or read the bar code. The mobile station establishes a connection with the record company's server 1360 with database 1365 through wireless access point 1350. The identification number associated with the product is provided to the server. The server finds the identification number and sample files related to the identification number provided. The samples are then downloaded 1380 to the mobile station 1330 through wireless access point 1350. The sample files may be MPEG-1 Layer 3 (MP3), MPEG-2 Advanced Audio Coding (MC) or the like.

An alternative system would be that the music store has a local wireless system as was described above in section regarding fast food. The sample files of music offered for sale at the store may be store in database 1345 of store server 1340. The identification number is provided to the server 1340 and database 1345 is searched for identification number and the associated sample files. Once located, the samples are transmitted 1370 to mobile station 1330.

This invention has been described relative to specific embodiments. Modifications that become apparent to persons of ordinary skill in the art only after reading this document are deemed within the spirit and scope of the invention. Applicant's use of the term "plurality" shall be defined as one or more.

What is claimed is:

1. A method for operating a reservation system that includes a first user terminal and a second terminal, the first user terminal having at least one application, the method comprising the steps of:

establishing a communication link from the at least one application to the second terminal through a wireless interface;

receiving a menu message on said first user terminal comprising a questions regarding needs of user in order to create a criteria information message;

sending said criteria information message comprising information regarding needs of the user to said second terminal;

receiving a second menu message on said first user terminal comprising a plurality of available items meeting said user criteria;

selecting one or more items from said plurality of items;

sending a selection message comprising information regarding said selected items to said second terminal receiving an amount to pay message on first user terminal in response to said selection message comprising transaction information;

entering information into the first user terminal specifying that a payment be made from the first user terminal to the second terminal;

establishing a communication link from the at least one application to the second terminal through an electromagnetic induction interrogator;

registering a payment transaction with the second terminal and the at least one application; and receiving location information of said selected item and an electronic code for unlocking said item.

2. The method of claim 1, further comprising the step of receiving data in the form of digital cash as reward for using system.

* * * * *

UNITED STATES PATENT AND TRADEMARK OFFICE
CERTIFICATE OF CORRECTION

| | |
|---|---|
| PATENT NO. | : 7,133,659 B2 |
| APPLICATION NO. | : 10/752178 |
| DATED | : November 7, 2006 |
| INVENTOR(S) | : Zalewski et al. |

It is certified that error appears in the above-identified patent and that said Letters Patent is hereby corrected as shown below:

<u>Column 4,</u>

Line 2, "sill" should read --still--.

<u>Column 8,</u>

Line 53, "tab" should read --tag--.

<u>Column 13,</u>

Line 49, "expanded" should read --expended--.

Signed and Sealed this

Twentieth Day of March, 2007

JON W. DUDAS
*Director of the United States Patent and Trademark Office*